United States Patent [19]
de Groot

[11] Patent Number: 5,020,901
[45] Date of Patent: Jun. 4, 1991

[54] MULTIMODE LASER DIODE SYSTEM FOR RANGE MEASUREMENT

[75] Inventor: Peter de Groot, Bethel, Conn.

[73] Assignee: The Perkin-Elmer Corporation, Norwalk, Conn.

[21] Appl. No.: 472,973

[22] Filed: Jan. 30, 1990

[51] Int. Cl.$^5$ .......................... G01C 3/08; G01B 9/02
[52] U.S. Cl. ........................................ 356/5; 356/4.5; 356/345; 372/26
[58] Field of Search ........................ 356/4, 5, 4.5, 345, 356/349; 372/19, 23, 26

[56] References Cited

U.S. PATENT DOCUMENTS

| 4,927,263 | 5/1990 | de Groot et al. | 356/5 |
| 4,928,152 | 5/1990 | Gerardin | 356/5 |

OTHER PUBLICATIONS

"Range Finding Using Frequency-Modulated Lase Diode", by G. Behiem and K. Fritsh, Applied Optics 25, 1439 (1986).
"Laser Diode Feedback Interferometer for Stabilization and Displacement Measurement" by T. Yoshino, M. Nara, S. Mnatzakanian, B. S. Lee, and T. C. Strand, Applied Optics 26, 892 (1987).
"Small Laser Doppler Velcimeter Based on the Self-Mixing Effect in a Diode Laser" by H. W. Jentink, F. F. M. de Mul, H. E. Susihes, J. G. Aamoudse, and J. Greve, Applied Optics 27, 379 (1988).

Primary Examiner—Linda J. Wallace
Attorney, Agent, or Firm—Thomas P. Murphy; Edwin T. Grimes

[57] ABSTRACT

A laser system includes a multimode laser diode positioned at a range from a target. Backscatter from the target returns into the diode and to modify the emission. An induced modulation frequency in the emission effects oscillatory mode transitions to create an amplitude modulation in mode power for a selected mode, the mode being selected by an optical spectrum analyser or an interference filter. The diode is positioned initially for a minimum in the amplitude modulation, and readjusted by a selected increment in response to an incremental change in target position so as to reestablish the amplitude modulation to the minimum. The incremental change thereby equals the selected increment.

38 Claims, 5 Drawing Sheets

FIG.3
PROIR ART

MULTIMODE LASER DIODE SYSTEM FOR RANGE MEASUREMENT

This invention relates to range measurement with lasers, and particularly to a laser diode system for precision measurement of small changes in the range of a target object.

BACKGROUND OF THE INVENTION

Optical radar for ranging became feasible with the advent of the laser. Target range (distance) measurement has been effected with laser diodes by modulating the current used to drive the laser diode, for example as disclosed in an article "Range Finding Using Frequency-modulated Lase Diode" by G. Behiem and K. Fritsh, Applied Optics 25, 1439 (1986). This modulation introduces a so-called chirp frequency into the laser emission. Backscatter from a target, combined with the frequency chirp, introduces an amplitude modulation of the laser output which is used for computing range.

Further results of self-coupling of a laser diode to an external reflector are presented in an article "Laser Diode Feedback Interferometer for Stabilization and Displacement Measurements", by T. Yoshino, M. Nara, S. Mnatzakanian, B. S. Lee, and T. C. Strand, Applied Optics 26, 892 (1987). This article is directed toward measurements related to alterations to the optical path between the diode and the reflector.

Most investigations and utilizations of laser diodes for ranging and velocimetry, including those of the foregoing references, have been with single-mode (i.e. single frequency) laser operation, or at least where modes are not important. An article "Small Laser Dopper Velocimeter Based On The Self-mixing Effect In A Diode Laser", by H. W. Jentink, F. F. M. de Mul, H. E. Suichies, J. G. Aamoudse, and J. Greve, Applied Optics 27, 379 (1988) teaches multimode operation. This article is directed primarily to velocimetry but mentions some results on a cyclic dependence of Doppler strength on range, based on measurements of total laser output power.

SUMMARY OF THE INVENTION

An object of the invention is to provide an improved laser diode system for precision measurement of small changes in the range of a target. Another object is to provide a novel utilization of multimode laser diode operation for making precision measurements in range.

The foregoing and other objects are achieved by a laser system comprising a multimode laser diode and power supply means for providing a DC driver current to the laser diode so as to produce laser emission with a plurality of optical frequencies each corresponding to a separate lasing mode and having a corresponding mode power. The laser diode is positioned at a range from a target, and a beam of the emission is directed to the target so as to allow backscatter therefrom to return into the laser diode and thereby modify the emission. A modulation, such as a square wave AC, added to the driver current generates a modulation frequency in the emission so as to effect oscillatory mode transitions at the modulation frequency and thereby create an amplitude modulation in mode power for a selected mode, such that the amplitude modulation varies cyclically through changes in the range. A detector is receptive of emission at the optical frequency for the selected mode for detecting the amplitude modulation thereof and producing a signal representative thereof. Analyzing means are receptive of the signal for relating the amplitude modulation to an incremental change in the range.

The beam will have an optical path length between the laser diode and the target, corresponding to the range, and the amplitude modulation will have a phase relative to the optical path length. In a preferred aspect of the invention the analyzing means comprises path means for initially adjusting the optical path length so as to establish the amplitude modulation at a selected phase, and for subsequently readjusting the optical path length by a selected increment in response to an incremental change in target position so as to reestablish the amplitude modulation to the selected phase. A processor is receptive of the detector signal for relating the incremental change to the selected increment.

For optimum precision the selected phase should correspond to a minimum value in the amplitude modulation. It also is preferable that amplitude modulation be presented by a modulation depth defined as a ratio of the amplitude modulation to the average mode power.

In a preferred embodiment the path means comprises the positioning means for positioning the laser diode so as to adjust and readjust the optical path length, whereby the selected increment equals the incremental change. The positioning means may comprise a hand-adjustable micrometer screw for readjusting the range so as to maintain the selected phase, or a servomechanism.

Alternatively the path means may comprise an optical wedge positioned in the beam to modify the optical path length, and placement means for initially adjusting the wedge position laterally in the beam so as to establish the amplitude modulation at the selected phase, and for subsequently readjusting the wedge position laterally to change the optical path length by a selected increment in response to an incremental change in target position so as to reestablish the amplitude modulation to the selected phase. The analyzing means then comprises means for determining the lateral position of the optical wedge, and presenting the lateral position as a measure of the incremental change.

For certain other embodiments the diode and driver are such that the plurality of optical frequencies consists essentially of two primary optical frequencies and two corresponding lasing modes. In one such embodiment the detector means comprises an interferometer receptive of a portion of the emission for effecting a pair of interference patterns alternating between the two modes at the modulation frequency. A photodetector is receptive of a pattern for one of the two modes for detecting the amplitude modulation thereof.

In another embodiment the analyzing means comprises an optical transmission plate with an optical thickness equal to one half of the optical length of the diode or a low odd multiple thereof. An oscillatory means periodically interposes the plate into the beam whereby the amplitude modulation of a selected mode or the total laser power alternately consists of a first modulation without the plate in the beam and a second modulation with the plate in the beam, so that the first modulation has a difference from the second modulation. A processing means is receptive of the detector signal for calculating and presenting the difference as a measure of an incremental change in the range.

The objects are also achieved by a method for measuring small changes in the range of a target object with a laser system including a multimode laser diode. The method comprises providing a DC driver current to the laser diode so as to produce laser emission with a plurality of optical frequencies each corresponding to a separate lasing mode and having a corresponding mode power, positioning the laser diode at a range from a target, directing a beam of the emission to the target so as to allow backscatter therefrom to return into the laser diode and thereby modify the emission, generating a modulation frequency in the emission so as to effect oscillatory mode transitions at the modulation frequency and thereby create an amplitude modulation in mode power for a selected mode such that the amplitude modulation varies cyclically through changes in the range, detecting the amplitude modulation for the selected mode, and relating the amplitude modulation to an incremental change in the range.

In a preferred aspect of the method, and the step of relating comprises the steps of initially adjusting the optical path length so as to establish the amplitude modulation at a selected phase, subsequently readjusting the optical path length by a selected increment in response to an incremental change in target position so as to reestablish the amplitude modulation to the selected phase, and relating the incremental change to the selected increment. Preferably the selected phase corresponds to a minimum value in the amplitude modulation, and the latter is represented by modulation depth. The steps of adjusting and readjusting respectively may comprise positioning and repositioning the laser diode from the target, whereby the selected increment equals the incremental change.

DETAILED DESCRIPTION OF THE INVENTION

Figure 1:
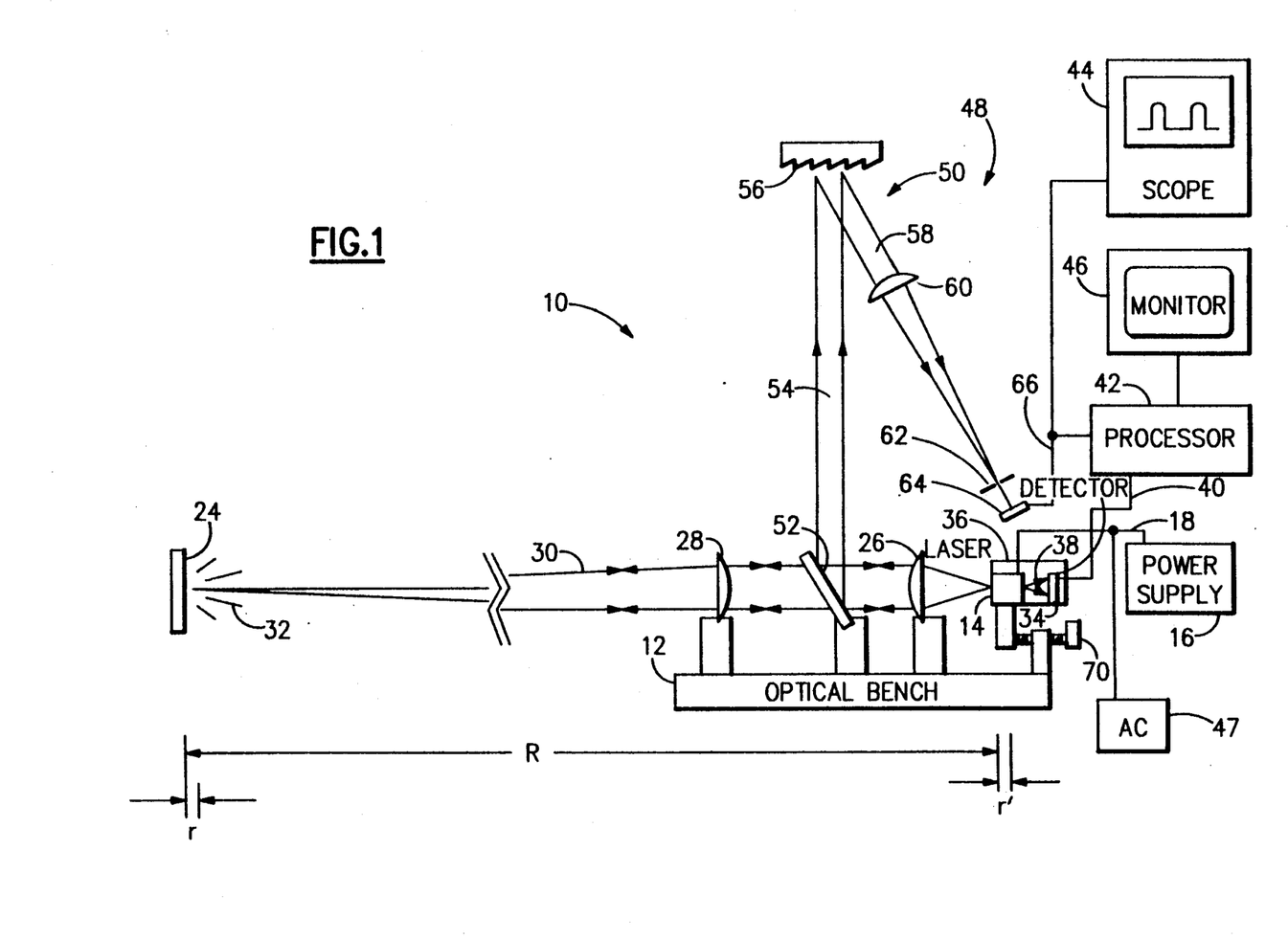
FIG. 1 is a schematic drawing of a laser system according to an embodiment of the invention.
Figure 2:
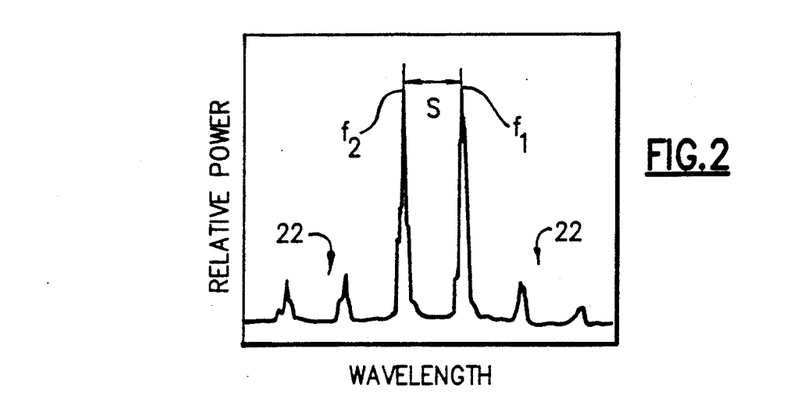
FIG. 2 is a spectrum of laser power of the system of FIG. 1.

With reference to FIG. 1, a laser system 10 includes an optical bench 12 or other container or platform for supporting a multimode type of laser diode 14 such as a Sharp LTO30MDO AlGaAs index-guided diode with a nominal 750 nm wavelength and a normal operating power of 3 mW. A power supply 16 provides a DC driver current, e.g. 39 mA on a line 18 to the diode. A typical spectrum of this device when biased for 1 mW output is shown in FIG. 2. Two primary frequency peaks $f_1$ and $f_2$ corresponding to separate lasing modes are visible, along with a number of satellite peaks 22. The primary peaks in this case are separated by 0.3 nm. By tuning the current input different spectra are possible, including more than two strong peaks. Unless otherwise indicated hereafter, two or more such peaks may be present according to the invention.

The diode is positioned at a range (distance) R (FIG. 1) from a target object 24. The nominal range may be known. The intention of the invention is to measure small incremental changes r in the range that may occur from movement of the target 24 or diode 14, or from scanning a target a tilt or with a surface profile, or the like.

An objective lens system focuses the emission nominally at the target object. This preferably comprises a collimator lens 26 spaced from the diode 14 by approximately the focal length of the collimator, and an objective lens 28 spaced from the collimator 26 and focused to the target 24. Exact focusing is not critical but may be effected by small adjustments of the collimator with respect to the diode 14.

The lenses 26,28 function as beaming means for directing a beam 30 of the emission to the target 24 so as to allow backscatter 32 therefrom, some of which is returned into the laser diode 14 via the lenses. This backscattered emission operates as an optical feedback that modifies the lasing emission in the manner disclosed in the aforementioned articles.

Total laser output power is conveniently received and measured with a photodetector 34 ordinarily included in the package 36 with the laser diode 14. This detector receives some emission 38 emitted from the backside of the diode. A signal from the detector proportional to the laser power is directed on a line 40 to a data processor 42 and/or an oscilloscope 44 or other means of utilizing and/or displaying the information. The processor may have a monitor 46.

Figure 3:
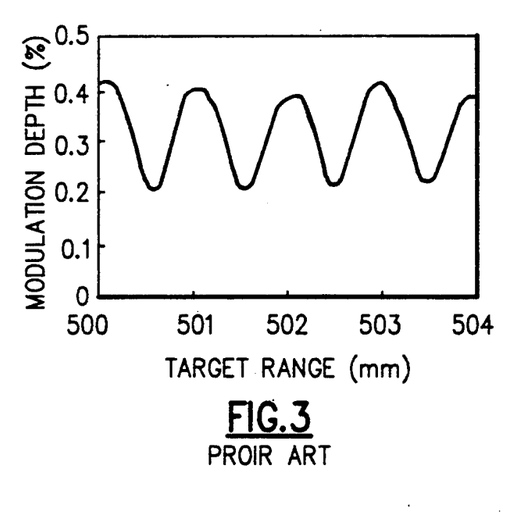
FIG. 3 is a plot of modulation depth vs target range in the manner of prior art.

An AC generator 47 adds an AC current to the driver current on line 18 so as to generate a modulation frequency in the emission at the AC frequency such as 1 kHz. Preferably the AC is a triangular wave, e.g. at 1 mA and 1 kHz. This effects oscillatory mode transitions at the modulation frequency, viz. transitions between the peaks shown in FIG. 2. The result is an amplitude modulation in the total laser output power at the modulation frequency, as detected by the packaged detector 34. As shown in FIG. 3, and as disclosed in the article by Jentink et al, this modulation in total power varies cyclically with distance.

According to an embodiment of the invention a preferred detector means 48 comprises a spectrometer 50 receptive of a portion of the emission for separating the optical frequencies. A beam splitter consisting of a glass plate 52 deflects a portion 54 of emission from the beam 30 to a diffraction grating 56 that separates the frequencies into a spectrum 58. An objective lens 60 focuses the spectrum through a slit 62 to a second photodetector 64 which may be a multiple-detector CCD chip or the like (without the slit 62) for detecting a range of frequencies, or a dedicated detector positioned (as shown) to receive only emission through the slit from the spectrometer for the selected frequency mode. The detector 64 produces at an output signal on a line 66 representing the emission of a selected mode, e.g frequency $f_1$ or $f_2$ of FIG. 2. This signal is forwarded to the processor 42 and/or the oscilloscope 44. The detector means are fundamentally different than those described in the articles by Jentink et al: Jentink measured total power, whereas the present system measures power of each wavelength.

Figure 4:
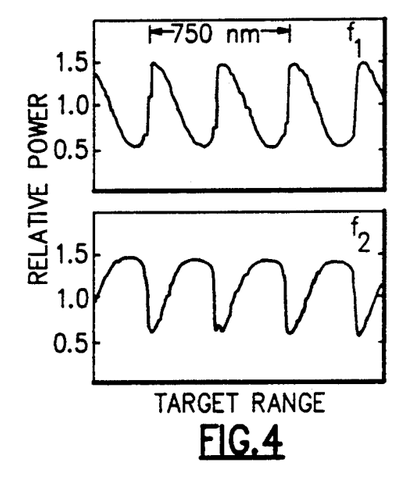
FIG. 4 is two plots of signal strength vs target range for the two primary peaks of FIG. 2.
Figure 5:
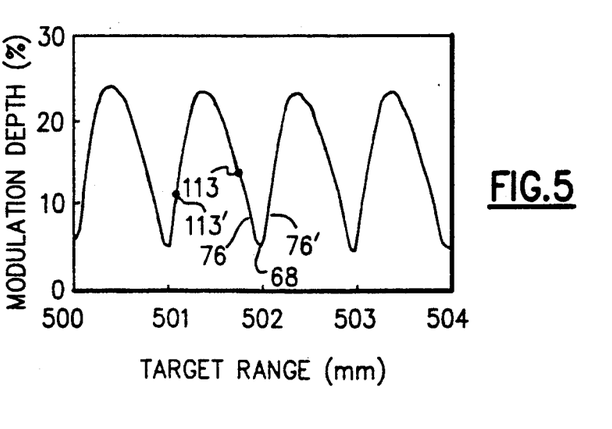
FIG. 5 is a plot of modulation depth vs. target range for one of the primary peaks of FIG. 2.

FIG. 4 shows variation of laser power at the two different primary frequencies $f_1$ and $f_2$ of FIG. 2 over a variation in target range. The opposite phasing reflects the transition between modes with changes in range. These mode transitions also create an amplitude modulation, at the modulation frequency, in the mode power for each of the mode frequencies. The modulation is detected by the photodetector 64 on the spectrometer 50. As shown in FIG. 5 for one (either) of the primary frequencies, this amplitude modulation depends precisely on the range, and varies cyclically through changes in the range. The cycle periods are equal to the optical thickness (actual thickness times index of refraction of the laser diode) which typically is around 1 mm. The amplitude modulation typically is presented as half of peak-to-peak signal strength.

Modulation depth is defined as a ratio of the amplitude modulation to the average power, the latter also being detected by either of the detectors for all frequencies or the selected mode, as required. The depth is readily calculated by the processor. It was discovered that, particularly for a selected mode, modulation depth varies even more precisely with changes in the range. FIG. 5 actually shows modulation depth against target distance, for one of the frequencies of FIG. 2, with a tilted rotating disk for a target. (The rotating disk was used to effect the modulation frequency at 5 kHz in place of the AC generator.) Of particular interest to the present invention is the very sharp minimums. These compare with a similar plot shown in FIG. 3 for the modulation depth for total output power (over all frequencies, detected by the packaged detector 34) in the manner of prior art where the minima and maxima are not as sharp. Furthermore, the modulation depth for a specific optical frequency is, e.g., 25%, whereas for total power the modulation depth is much smaller, e.g. 0.25%.

Generally, the analysis with the system is based on relating the amplitude modulation, preferably as the modulation depth, to incremental changes in range. According to a preferred aspect of the invention, a means of analyzing the detected information to provide range data comprises a path means for initially adjusting the range R so as to establish the amplitude modulation at a selected phase, and for subsequently readjusting the range by a selected increment in response to an incremental change 2 in target position so as to reestablish the amplitude modulation to the selected phase. Most preferably the selected phase corresponds to a sharp minimum 68 in the modulation depth as shown in FIG. 5.

There are various ways to adjust and readjust the range according to the invention. In one way the path means comprises a means for positioning the diode such as a hand-adjustable micrometer screw 70 (FIG. 1). Modulation depth is presented conveniently via the processor 42 as a digital readout on the monitor 46 while the micrometer 70 is adjusted to the minimum 68 in the depth (FIG. 5). The range R is then changed by an increment r such as by a moved target or by scanning the beam to a new location on a target with tilt or a profile. The micrometer is readjusted by a selected increment r' to again achieve the minimum 68. The incremental change r' in micrometer reading equals the incremental change r in range that occurred at the target.

Figure 6:
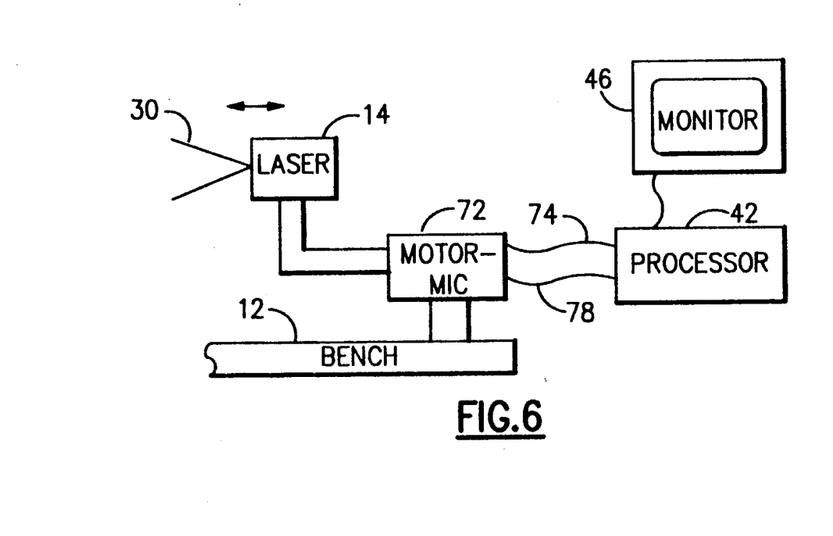
FIG. 6 is a schematic drawing of a portion of a laser system according to a second embodiment of the invention.

Alternatively, the adjustments may be done automatically with a servomechanism 72 (FIG. 6) such as a motorized micrometer responsive to the selected phase. A feedback signal on a line 74 from the processor 42 derived from an upslope 76 or 76' (FIG. 5) of modulation depth from the minimum is fed to the servo to continuously maintain the minimum. Position information from the servomechanism may be relayed back on a line 78 to the processor for display on the monitor. In a variation (not shown) for robotic position sensing the entire system (except target) may be on a servomechanism stage.

Figure 7:
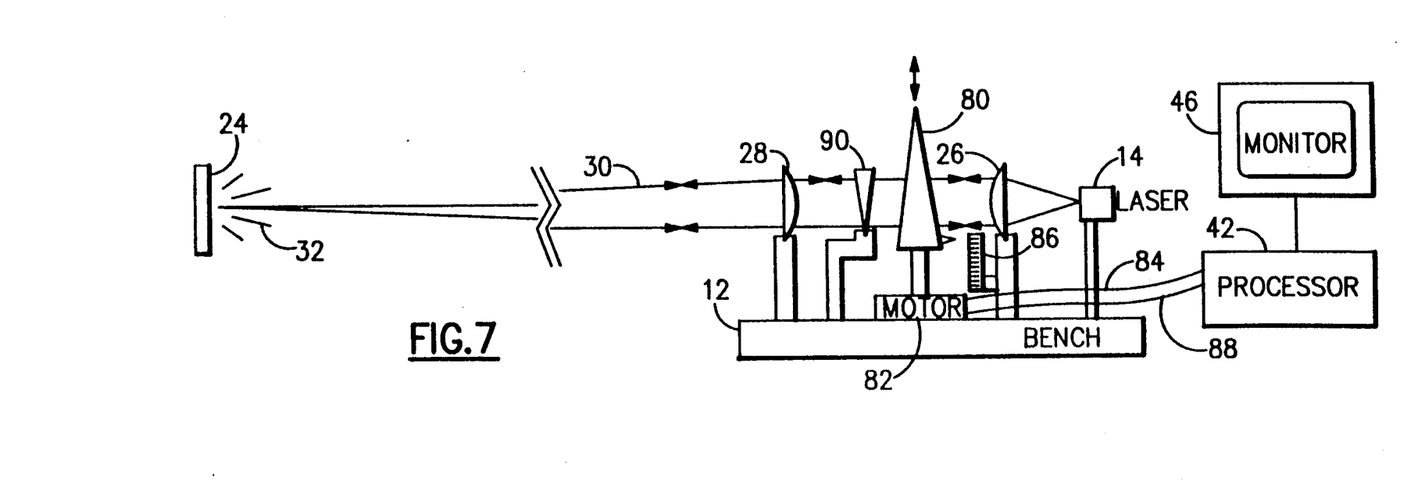
FIG. 7 is a schematic drawing of a portion of a laser system according to a third embodiment of the invention.

More generally, adjustments are made in the optical path of the beam, with the optical path representing the range by taking indexes of refraction of optical elements in the beam into account. For example, in another embodiment (FIG. 7) the path means comprises an optical wedge 80 positioned in the beam 30 between the lenses 26,28 to modify the optical path. The wedge is common optical quality glass or plastic with an index of refraction different than for air. A placement means such as a lateral hand or motorized micrometer 82 driven by a signal from the processor 42 on a line 84 is used to initially adjust the wedge position laterally in the beam so as to establish the amplitude modulation at the minimum (FIG. 5), and to subsequently readjust the wedge position laterally to change the optical path by a selected increment in response to an incremental change in target position so as to reestablish the amplitude modulation to the minimum. A locating means associated the wedge, which maybe a simple scale 86, determines the lateral position of the optical wedge. The processor also may be made responsive to the lateral position by a signal on a line 88 for presenting the lateral wedge position on the monitor 46 as a measure of the incremental change. Empirical calibration conveniently provides the measure. Since lateral movement of the wedge may be several centimeters for a 1 mm range increment, excellent accuracy is achieved. The wedge alternatively may be formed of a series of uniformly thick steps. An optical second wedge 90 may be positioned in the beam oriented oppositely from wedge 80.

Figure 8:
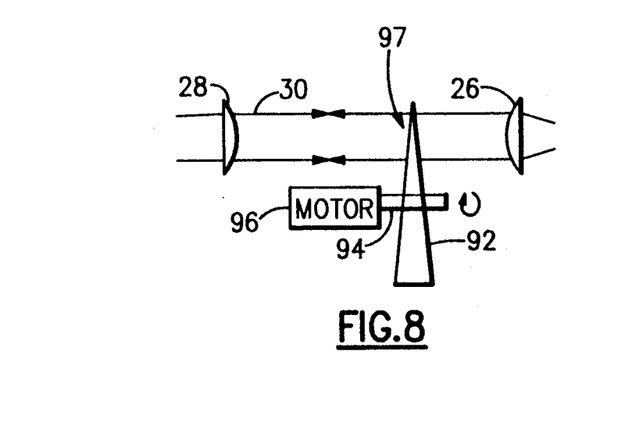
FIG. 8 is a schematic drawing of a portion of a laser system according to a fourth embodiment of the invention.

As indicated above the amplitude modulation may be induced by a modulation in the driver current. As an alternative shown in FIG. 8 the modulation means may comprise a wedge-shaped or other non-uniform optical transmission disk 92 with an axle 94 and a varying optical thickness relative to orientation about the axle. The disk is positioned between the lenses 26,28 with its axis parallel and adjacent to the beam 30. A motor 96 rotates the optical disk on the axle, with a segment 97 of the optical disk disposed in the beam so as to modify the optical path over a cyclically varying value. The cyclincially varying path and the optical feedback from the target are sufficient to generate the modulation frequency.

Figure 9:
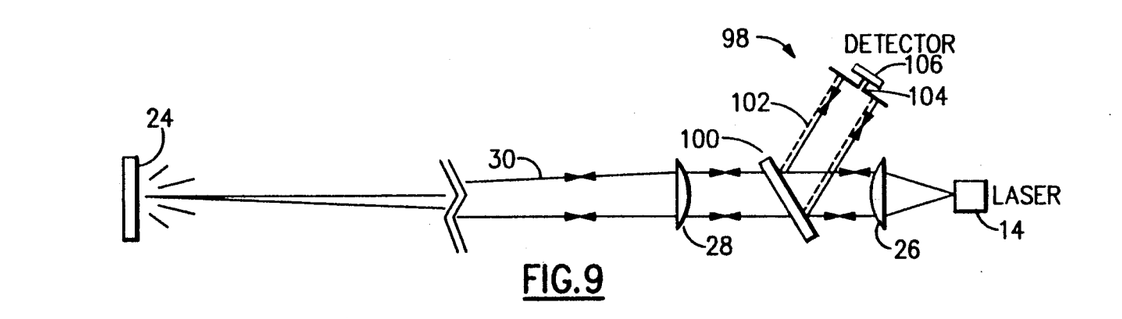
FIG. 9 is a schematic drawing of a portion of a laser system according to a fifth embodiment of the invention.

Illustrated in FIG. 9, a simple interferometer 98 may be used in place of the spectrometer 50 (FIG. 1) as a detector means, greatly simplifying the system. An optical plate 100 such as a microscope slide is disposed at an acute angle in the beam 30 so as to effect a Fabry-Perot interference pattern of the two primary optical frequencies in the laser emission. This pattern 102 is directed away from the beam to a slit or orifice 104 for selecting a maximum intensity from the pattern, and directing the same to a photodetector 106. The pattern actually is a pair of alternating interference patterns, and the photodetector is situated to receive a small segment of one pattern for one of the two modes, so as to detect the amplitude modulation of the intensity in the segment. The detector thus provides a signal representing amplitude modulation for one of the modes.

Figure 10:
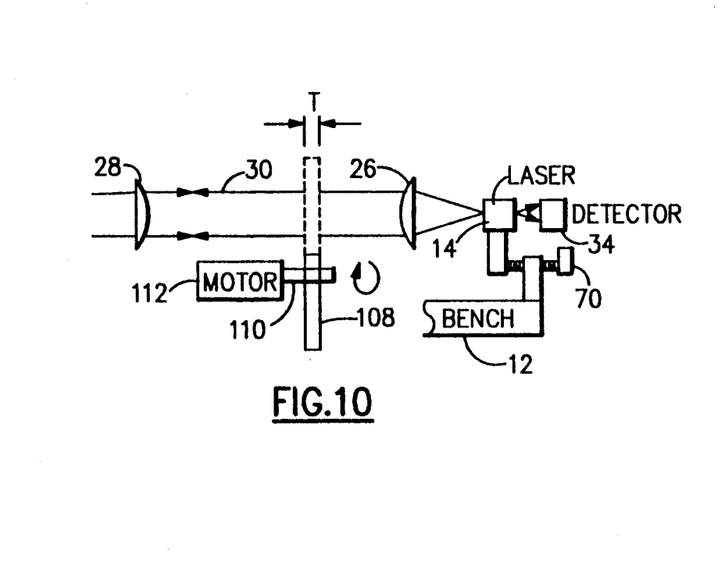
FIG. 10 is a schematic drawing of a portion of a laser system according to a sixth embodiment of the invention.

A further embodiment for providing precision detection and analysis for small increments is shown in FIG. 10, utilizes the fact that the two optical frequencies have a wavelength separation S, e.g. of 0.3 nm (FIG. 2). The analyzing means comprises an optical transmission plate 108 with an optical thickness (actual thickness T times refractive index) equal to one half of the optical length of the laser (or a low odd multiple thereof, such as a multiple of 3 or 5). The plate is in the form of a half disk with a perpendicular axle 110 near the cutoff. An equivalent variation (not shown) is a full disk, half of which is thicker than the other by half of the optical length of the laser.

Figure 11A:
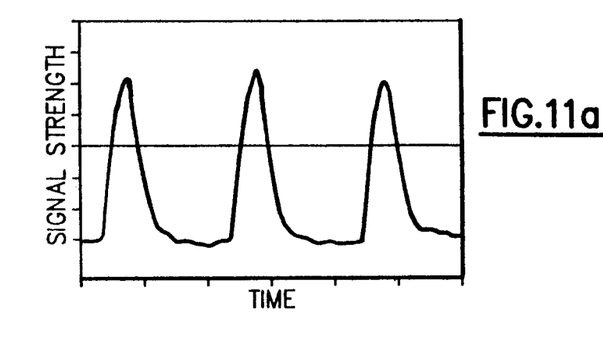
FIG. 11a is a plot of a signal strength vs time for a signal from a detector component of FIG. 10.
Figure 11B:
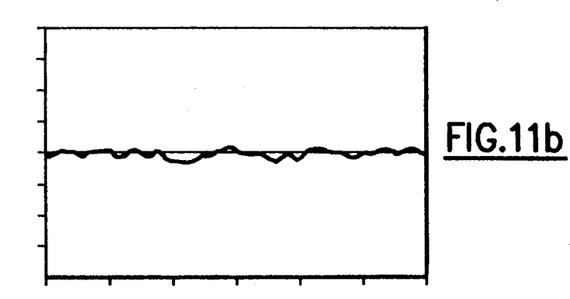
FIG. 11b is a plot as for FIG. 11a, with the target range adjusted for null signal strength.

In either case the disk/plate 108 is rotated on the axle 110 in and out of the beam 30 by a motor 112, thus providing oscillatory means for periodically interposing the plate (or extra thickness) into the beam (once per revolution). The optical path thus alternates between two values (FIG. 2). The amplitude modulation (induced by current modulation or transmission plate as explained above) thereby alternately consists of a first modulation without the plate in the beam and a second modulation with the plate in the beam, so that the first modulation has a different level than the second modulation as shown in FIG. 11a. Because of the selected thickness of the half-plate, the different level is related to a half-cycle phase difference in the amplitude modulation (or preferably modulation depth) relative to the incremental changes r in range (FIG. 1), the curve being sampled alternately at two points 113,113' on either side of a peak (or valley) (FIG. 5) if the asymetrical curve. If the range is initially adjusted (e.g. by micrometer 70 on the diode 14) so that the two points are perfectly centered at the valley minima (or peaks) there will be no difference between the first and second modulations (FIG. 11b) so that there is effectively a null.

Any incremental change (within the wavelength separation S of the frequencies, FIG. 2) in target range may be compensated by a selected increment of micrometer readjustment to reestablish the null. Alternatively the micrometer 70 may be omitted and the incremental change computed by the processor 42, as the distance from a peak center can be determined over one half of the peak separation by a standard centroiding algorithm. This method was shown to be sensitive to displacements of 10 microns for a peak separation of 650 microns.

Figure 12:
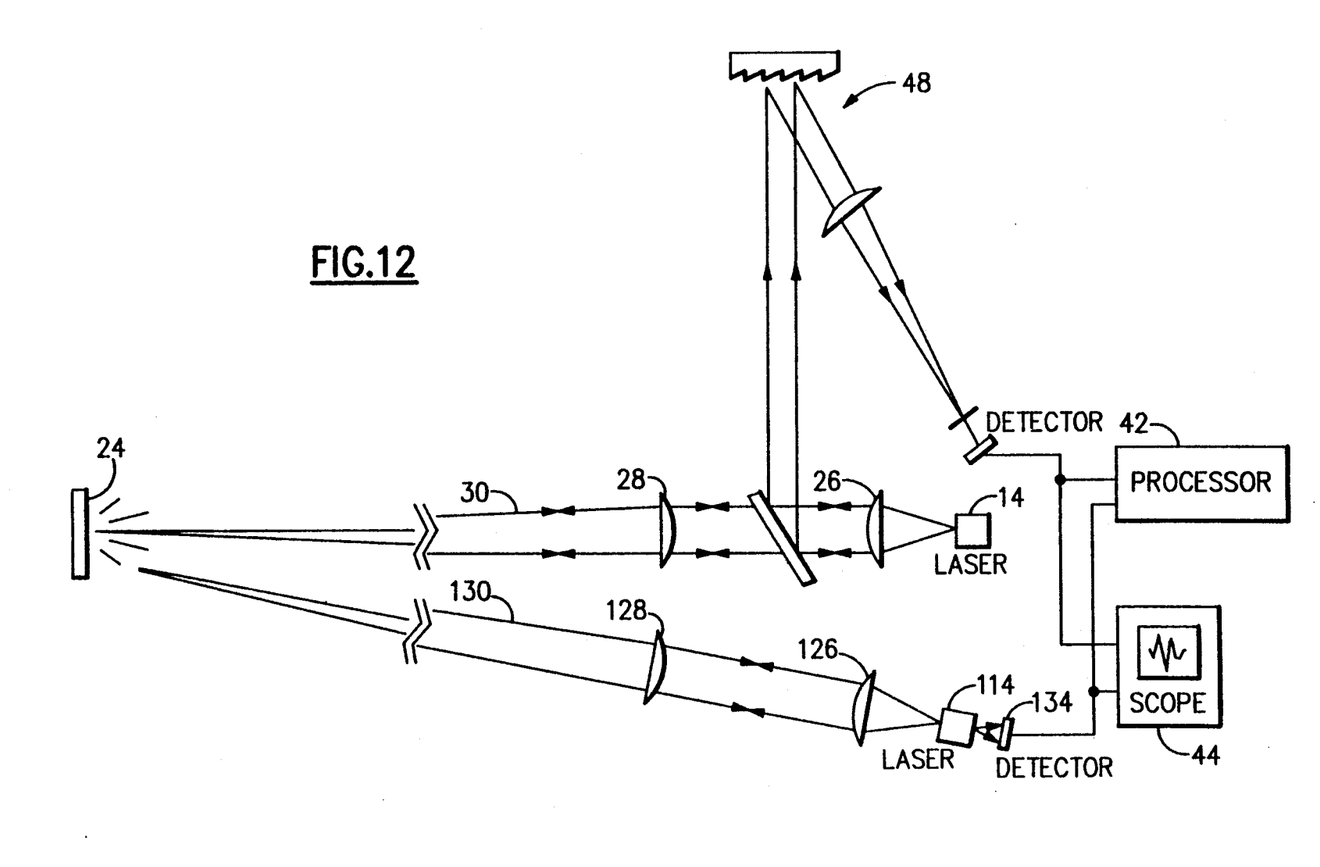
FIG. 12 is a schematic drawing of a portion of a laser system according to a seventh embodiment of the invention.

The embodiments disclosed above are directed to measuring changes, and do not provide a direct measurement of absolute range. Also, because of the periodicity in the amplitude modulation, there may be an uncertainty in measuring a change in range greater than the optical thickness of the diode, which is the periodicity. If the nominal value of the range is needed, or if period uncertainties need to be removed, a conventional or other desired ranging apparatus may be added to the system as illustrated in FIG. 12. It is convenient and advantageous to base such an apparatus on a similar laser diode 114 directing a second beam 130 to the target through lenses 126,128. The second diode should have an optical thickness sufficiently different than the optical thickness of the first diode to minimize optical interference between the two diodes; in other words the emission of one diode should not significantly modify the lasing action of the other. Although two diodes are utilized in this embodiment, it is not necessary to provide the special frequency stabilization, via temperature stabilization, required for precision measurements with prior art dual-diode interferometers.

In one example the second diode apparatus is substantially the same as the first according the invention, except for the diode thickness. The two different periodicities in the modulations provide a vernier that extends the uncertainty range from about one millimeter for a single diode system to several centimeters. The extension may be observed by displaying or even superimposing the modulation depth vs range data on the same oscilloscope 44, or the processor 42 may compute the extended range increment. A simpler alternative, shown in FIG. 12, is to use a packaged detector 134 on the second diode 114, to measure modulation in total power, since accuracy is less critical for merely removing the uncertainty.

Another example of a diode apparatus for removing uncertainty is disclosed in "Ranging and Velocimetry Signal Generation In A Backscatter-modulated Laser Diode," Appl. Opt. 27. 4475 (1988) by P. de Groot, G. Gallatin and S. Macomber. In summary, in this apparatus a "chirp frequency modulation is introduced into the emission, preferably as a triangular wave. This may be effected with a triangular wave AC modulation to the driver current for the second laser diode, or a piezoelectric device on which the diode is mounted. Backscatter feedback from the target and the chirp cooperatively cause the emission to have a second modulation frequency proportional to the range. Sensitivity is enhanced by operation of the laser near threshold. Calibration allows the second frequency to be measured to provide the absolute range.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A laser system for precision measurement of small changes in the range of a target object, comprising a multimode laser diode, power supply means for providing a DC driver current to the laser diode so as to produce laser emission with a plurality of optical frequencies each corresponding to a separate lasing mode and having a corresponding mode power, positioning means for positioning the laser diode at a range from a target, beaming means for directing a beam of the emission to the target so as to allow backscatter therefrom to return into the laser diode and thereby modify the emission, modulation means for generating a modulation frequency in the emission so as to effect oscillatory mode transitions at the modulation frequency and thereby create an amplitude modulation in mode power for a selected mode such that the amplitude modulation varies cyclically through changes in the range, detector means receptive of emission at the optical frequency for the selected mode for detecting the amplitude modulation thereof and producing a detector signal representative thereof, and analyzing means receptive of the signal for relating the amplitude modulation to an incremental change in the range.

2. The system according to claim 1 wherein the detector means further detects an average mode power for the selected mode, and the analyzing means comprises processing means for calculating a modulation depth defined as a ratio of the amplitude modulation to the average mode power, and relating the modulation depth to the incremental change.

3. The system according to claim 1 wherein the detector means comprises spectrometer means receptive of a portion of the emission for separating the optical frequencies, and a photodetector receptive of emission from the spectrometer for the selected mode for producing the signal representing the amplitude modulation thereof.

4. The system according to claim 3 wherein the system further comprises a deflector for deflecting the portion of the emission from the beam, and the spectrometer comprises a diffraction grating receptive of the portion.

5. The system according to claim 1 wherein the beam has an optical path length between the laser diode and the target corresponding to the range, the amplitude modulation has a phase relative to the optical path length, and the analyzing means comprises path means for initially adjusting the optical path length so as to establish the amplitude modulation at a selected phase, and for subsequently readjusting the optical path length by a selected increment in response to an incremental change in target position so as to reestablish the amplitude modulation to the selected phase, and processing means receptive of the detector signal for relating the incremental change to the selected increment.

6. The system according to claim 5 wherein the selected phase corresponds to a minimum value in the amplitude modulation.

7. The system according to claim 5 wherein the modulation means comprises means for modulating the driver current at the modulation frequency.

8. The system according to claim 7 wherein the driver current is modulated with a triangular wave form.

9. The system according to claim 5 wherein the detector means further detects an average mode power for the selected mode, and the processing means calculates a modulation depth defined as a ratio of the amplitude modulation to the average mode power, such that the modulation depth has the phase relative to the optical path length, the path means initially adjusts the optical path length so as to establish the modulation depth at the selected phase, and subsequently readjusts the optical path length by the selected increment in response to the incremental change in target position so as to reestablish the modulation depth to the selected phase.

10. The system according to claim 5 wherein the path means comprises the positioning means for positioning the laser diode so as to adjust and readjust the optical path length, so that the analyzing means thereby comprises the positioning means, whereby the selected increment equals the incremental change.

11. The system according to claim 10 wherein the processing means displays the amplitude modulation so as to allow determination of phase, and the positioning means comprises a hand-adjustable micrometer screw for readjusting the range so as to maintain the selected phase.

12. The system according to claim 10 wherein the processing means generates a phase signal representing the phase, and the positioning means comprises a servo-mechanism receptive of the phase signal for readjusting the range so as to maintain the selected phase.

13. The system according to claim 5 wherein the path means comprises an optical wedge positioned in the beam to modify the optical path length, and placement means for initially adjusting the wedge position laterally in the beam so as to establish the amplitude modulation at the selected phase, and for subsequently readjusting the wedge position laterally to change the optical path length by a selected increment in response to an incremental change in target position so as to reestablish the amplitude modulation to the selected phase, and the analyzing means further comprises locating means for determining the lateral position of the optical wedge, the processing means being responsive to the locating means for presenting the lateral position as a measure of the incremental change.

14. The system according to claim 13 wherein the optical wedge has a predetermined optical taper, and the system further comprises a second optical wedge having the same optical taper, the second wedge being oppositely oriented in the beam to the first optical wedge so that the first and second wedges cooperatively provide a uniform optical path across the beam.

15. The system according to claim 1 wherein the beam has an optical path length between the laser diode and the target corresponding to the range, and the modulation means comprises an optical transmission disk with an axis and a varying optical thickness relative to orientation about the axis, and rotating means for rotating the optical disk about the axis with a segment of the rotating optical disk disposed in the beam so as to cyclically vary the optical path length, thereby generating the modulation frequency.

16. The system according to claim 1 wherein the plurality of optical frequencies consists essentially of two primary optical frequencies.

17. The system according to claim 16 wherein the detector means comprises an interferometer receptive of a portion of the emission for effecting a pair of interference patterns alternating between the two modes at the modulation frequency, and a photodetector receptive of a pattern for one of the two modes for detecting the amplitude modulation thereof.

18. The system according to claim 17 wherein the interferometer comprises an optical interference plate disposed at an oblique angle in the beam so as to effect and direct the interference pattern from the beam to the photodetector.

19. The system according to claim 1 wherein the beaming means comprises an objective lens system for focusing the emission nominally at the target object.

20. The system according to claim 1 wherein the laser diode has a first optical thickness, and the system further comprises a laser apparatus including a second laser diode having a second optical thickness sufficiently different than the first optical thickness to minimize optical interference between the first and second diodes, the laser apparatus being adapted to nominally measure the range to an accuracy within the first optical thickness, thereby removing an uncertainty in range measurement over multiples of the first optical thickness.

21. A laser system for measuring small changes in the range of a target object, comprising a multimode laser diode, power supply means for providing a DC driver current to the laser diode so as to produce laser emission with an output power and a plurality of optical frequencies each corresponding to a separate lasing mode, positioning means for positioning the laser diode at a range from a target, beaming means for directing a beam of the emission to the target so as to allow backscatter therefrom to return into the laser diode and thereby modify the emission, the beam having an optical path length between the laser diode and the target corresponding to the range, modulation means for generating a modulation frequency in the emission so as to effect oscillatory mode transitions at the modulation frequency and thereby create an amplitude modulation in output power such that the amplitude modulation varies cyclically through changes in the range, detector means receptive of a portion of the emission for detecting the amplitude modulation, an optical wedge positioned in the beam to modify the optical path length, placement means for initially adjusting the wedge position laterally in the beam so as to establish the amplitude modulation at a selected phase, and for subsequently readjusting the wedge position laterally to change the optical path length by a selected increment in response to an incremental change in target position so as to reestablish the amplitude modulation to the selected phase, locating means for determining the lateral position of the optical wedge, and processing means responsive to the locating means for presenting the lateral wedge position as a measure of the incremental change.

22. A laser system for measuring small changes in the range of a target object, comprising:
a multimode laser diode;
power supply means for providing a DC driver current to the laser diode so as to produce laser emission with an output power and a plurality of optical frequencies each corresponding to a separate lasing mode;
positioning means for positioning the laser diode at a range from a target;
beaming means for directing a beam of the emission to the target so as to allow backscatter therefrom to return into the laser diode and thereby modify the emission, the beam having an optical path length between the laser diode and the target corresponding to the range;
modulation means for generating a modulation frequency in the emission so as to effect oscillatory mode transitions at the modulation frequency, thereby creating an amplitude modulation in output power such that the amplitude modulation varies cyclically through changes in the range, the modulation means comprising an optical transmission disk with an axis and a varying optical thickness relative to orientation about the axis, and rotating means for rotating the optical disk about the axis, the rotating optical disk being disposed in the beam so as to cyclically vary the optical path length, thereby generating the modulation frequency;
detector means receptive of a portion of the emission for detecting the amplitude modulation and producing a signal representative thereof; and
processing means receptive of the signal for relating the amplitude modulation to an incremental change in the range.

23. A laser system for measuring small changes in the range of a target object, comprising a multimode laser diode, power supply means for providing a DC driver current to the laser diode so as to produce laser emission with an output power and substantially two optical frequencies having a spatial separation, each frequency corresponding to a separate lasing mode, positioning means for positioning the laser diode at a range from a target, beaming means for directing a beam of the emission to the target so as to allow backscatter therefrom to return into the laser diode and thereby modify the emission, the beam having an optical path length between the laser diode and the target corresponding to the range;
modulation means for generating a modulation frequency in the emission so as to effect oscillatory mode transitions at the modulation frequency and thereby create an amplitude modulation in output power such that the amplitude modulation varies cyclically through changes in the range, detector means receptive of a portion of the emission for detecting the amplitude modulation and producing a signal representative thereof, an optical transmission plate with an optical thickness equal to one half of the spatial separation or a low odd multiple thereof, oscillatory means for periodically interposing the plate into the beam whereby the amplitude modulation alternately consists of a first modulation without the plate in the beam and a second modulation with the plate in the beam so that the first modulation has a difference from the second modulation and processing means receptive of the detector signal for calculating and presenting the difference as a measure of an incremental change in the range.

24. A laser system for measuring small changes in the range of a target object, comprising a multimode laser diode, power supply means for providing a DC driver current to the laser diode so as to produce laser emission with an output power and a plurality of optical frequencies each corresponding to a separate lasing mode, positioning means for positioning the laser diode at a range from a target, beaming means for directing a beam of the emission to the target so as to allow backscatter therefrom to return into the laser diode and thereby modify the emission, modulation means for generating a modulation frequency in the emission so as to effect oscillatory mode transitions at the modulation frequency and thereby create an amplitude modulation in output power such that the amplitude modulation varies cyclically through changes in the range, an interferometer receptive of a portion of the emission for effecting an interference pattern of the plurality of optical frequencies, a photodetector receptive of the pattern for detecting the amplitude modulation at a peak intensity in the pattern, and analyzing means responsive to the photodetector for relating the amplitude modulation to an incremental change in the range.

25. The system according to claim 24 wherein the interferometer comprises an optical plate disposed at an acute angle in the beam so as to effect and direct the interference pattern from the beam to the photodetecter.

26. A method for measuring small changes in the range of a target object with a laser system including a multimode laser diode, comprising providing a DC driver current to the laser diode so as to produce laser emission with a plurality of optical frequencies each corresponding to a separate lasing mode and having a corresponding mode power, positioning the laser diode at a range from a target, directing a beam of the emission to the target so as to allow backscatter therefrom to return into the laser diode and thereby modify the emission, generating a modulation frequency in the emission so as to effect oscillatory mode transitions at the modulation frequency, and thereby create an amplitude modulation in mode power for a selected mode such that the amplitude modulation varies cyclically through changes in the range, detecting the amplitude modulation for the selected mode, and relating the amplitude modulation to an incremental change in the range.

27. The method according to claim 26 further comprising detecting an average mode power for the selected mode, and wherein the step of relating comprises the steps of calculating a modulation depth defined as a ratio of the amplitude modulation to the average mode power, and relating the modulation depth to the incremental change.

28. The method according to claim 26 wherein the step of detecting comprises the steps of separating the optical frequencies, and detecting an optical frequency for the selected mode so as to detect the amplitude modulation thereof.

29. The method according to claim 26 wherein the beam has an optical path length between the laser diode and the target corresponding to the range, the amplitude modulation has a phase relative to the optical path length, and the step of relating comprises the steps of initially adjusting the optical path length so as to establish the amplitude modulation at a selected phase, subsequently readjusting the optical path length by a selected increment in response to an incremental change in target position so as to reestablish the amplitude modulation to the selected phase, and relating the incremental change to the selected increment.

30. The method according to claim 29 wherein the selected phase corresponds to a minimum value in the amplitude modulation.

31. The method according to claim 29 wherein the step of generating comprises modulating the driver current with a triangular wave form at the modulation frequency.

32. The method according to claim 29 wherein the step of detecting further comprises detecting an average mode power for the selected mode, and the step of relating further comprises calculating a modulation depth defined as a ratio of the amplitude modulation to the average mode power, such that the modulation depth has the phase relative to the optical path, the optical path length is initially adjusted so as to establish the modulation depth at the selected phase, and is subsequently readjusted by the selected increment in response to the incremental change in target position so as to reestablish the modulation depth to the selected phase.

33. The method according to claim 29 wherein the steps of adjusting and readjusting respectively comprise positioning and repositioning the laser diode from the target, whereby the selected increment equals the incremental change.

34. The method according to claim 29 wherein the system further includes an optical wedge positioned in the beam to modify the optical path length, and the step of relating comprises the steps of adjusting the wedge position laterally in the beam so as to establish the amplitude modulation at the selected phase, subsequently readjusting the wedge position laterally to change the optical path length by a selected increment in response to an incremental change in target position so as to reestablish the amplitude modulation to the selected phase, determining the lateral position of the optical wedge, and presenting the lateral position as a measure of the incremental change.

35. The method according to claim 26 wherein the system further includes an optical transmission disk with an axis and a varying optical thickness relative to orientation about the axis, the beam has an optical path length between the laser diode and the target corresponding to the range, and the step of generating comprises rotating the optical disk about the axis with a segment of the rotating optical disk disposed in the beam so as to cyclically vary the optical path length, thereby generating the modulation frequency.

36. The method according to claim 26 wherein the plurality of optical frequencies consists of two primary optical frequencies.

37. The method according to claim 36 wherein the step of detecting comprises the steps of effecting an interference pattern of the two optical frequencies, and detecting the amplitude modulation at a peak intensity in the pattern.

38. The method according to claim 36 wherein the two optical frequencies have a spatial separation, the system further includes an optical transmission plate with an optical thickness equal to one half of the spatial separation, and the step of analyzing comprises the steps of periodically interposing the plate into the beam whereby the amplitude modulation alternately consists of a first modulation without the plate in the beam and a second modulation with the plate in the beam so that the first modulation has a difference from the second modulation, and presenting the difference as a measure of an incremental change in the range.

* * * * *